(12) United States Patent
Becerril Hernández

(10) Patent No.: US 11,585,082 B2
(45) Date of Patent: Feb. 21, 2023

(54) AUTOMATED SYSTEM FOR ROBOTISED CONSTRUCTION AND CONSTRUCTION METHOD

(71) Applicant: Germán Becerril Hernández, Mexico City (MX)

(72) Inventor: Germán Becerril Hernández, Mexico City (MX)

( * ) Notice: Subject to any disclaimer, the term of this patent is extended or adjusted under 35 U.S.C. 154(b) by 345 days.

(21) Appl. No.: 16/635,848

(22) PCT Filed: Jul. 26, 2018

(86) PCT No.: PCT/MX2018/000069
§ 371 (c)(1),
(2) Date: Jan. 31, 2020

(87) PCT Pub. No.: WO2019/027311
PCT Pub. Date: Feb. 7, 2019

(65) Prior Publication Data
US 2020/0256051 A1   Aug. 13, 2020

(30) Foreign Application Priority Data
Jul. 31, 2017   (MX) ............... MX/a/2017/009909

(51) Int. Cl.
*B25J 11/00*   (2006.01)
*B25J 13/08*   (2006.01)
*B25J 15/00*   (2006.01)
*B25J 9/00*    (2006.01)
*E04B 1/35*    (2006.01)
*B23P 21/00*   (2006.01)

(52) U.S. Cl.
CPC ............... *E04B 1/35* (2013.01); *B25J 9/0096* (2013.01); *B25J 11/005* (2013.01); *B25J 13/086* (2013.01); *B25J 13/088* (2013.01); *B25J 15/008* (2013.01); *B25J 15/0019* (2013.01); *B23P 21/002* (2013.01); *E04B 2001/3588* (2013.01)

(58) Field of Classification Search
CPC ...... B25J 9/0096; B25J 11/005; B25J 13/086; B25J 13/088; B25J 15/008; B25J 15/0019; E04B 2001/3588; B23P 21/002
See application file for complete search history.

(56) References Cited

U.S. PATENT DOCUMENTS

| 8,185,240 | B2 | 5/2012 | Williams et al. |
| 8,606,399 | B2 | 12/2013 | Williams et al. |
| 2015/0206607 | A1* | 7/2015 | Park .................... B25J 9/046 74/490.01 |
| 2016/0001461 | A1 | 1/2016 | Gardiner et al. |

FOREIGN PATENT DOCUMENTS

| JP | H06238608 A | 8/1994 | |
| WO | WO-2018131237 A1 * | 7/2018 | ............ B25J 19/06 |

OTHER PUBLICATIONS

International Search Report issued in connection with the corresponding International Application No. PCT/MX2018/000069 dated Dec. 17, 2018.
Machine translation of JP H06238608.

* cited by examiner

*Primary Examiner* — Jermie E Cozart
(74) *Attorney, Agent, or Firm* — H. T. Than

(57) ABSTRACT

An automated system and method for construction and assembly of walls, floors and ceilings are disclosed. The automated system comprises at least one robotic arm, at least one material gripper tool, at least one sliding, rising and rotating system, and tongue-and-groove interconnection elements.

19 Claims, 5 Drawing Sheets

AUTOMATED SYSTEM FOR ROBOTISED CONSTRUCTION AND CONSTRUCTION METHOD

FIELD OF THE INVENTION

The present invention relates to the technical field of building construction. More particularly, it relates to the technical field of construction and assembly of walls, floors, ceilings, and stairs by automated systems using robotic arms.

State of Art

The construction of living places, households, houses, offices, and other structures has an ancient heritage. However, there are many difficulties and problems, among them, a large amount of manpower, workforce or labor is required which results in being too expensive. Due to this, the results of the construction effort are often inconsistent since the appearance and quality of one structure can vary from another built from the same design. The latter can be caused by differences in the skills, efforts, supervision and techniques employed by those that work on the structures.

The construction may also cause material waste; for example, when wood is used, standard lengths must usually be cut to meet design requirements, resulting in wood waste.

Similarly, the construction using labor can also be very time-consuming, requiring months, or even, years to be completed. Likewise, the construction is a dangerous activity due to serious and fatal accidents.

Conventional building construction typically comprises three primary systems and methods: (1) wood stud construction, (2) concrete block construction, and (3) concrete panel construction. The wood stud construction system requires skilled carpenters to assemble pieces and cut wood according to structural drawings that require skilled interpretation. The concrete block construction system is a slow technique to put them into place and requires a large number of skilled masons to carry out it effectively. Wherein the perimeter of a housing unit is comprised of concrete blocks arranged in a structurally solid fashion. Concrete panel construction system wherein precast panels are put into place against or in conjunction with a framing system, requires heavy equipment to lift and place the concrete panels as well as a skilled workforce to build the structure that provides the framing pattern for the panels.

Consequently, the development of better construction systems for low cost, efficient, and easily built housing units or households or living places has been slowed or stopped by the need for skilled workforce or labor to assemble the components required for the housing unit. In many places, skilled labor is limited and/or prohibitively expensive which has restricted the ability to construct in mass low-cost housing units, particularly in underdeveloped countries. Other current building construction technology-related problems include the need to build housing units at a low cost and quickly, the ability to build housing units having a resilient construction that does not require a great deal of maintenance, being structurally strong, and providing desired insulation from the elements. Thus, in many countries, the aspirations to modernize housing units have slowly decreased.

Furthermore, current construction methods typically rely on steel stud frames having insulation sprayed or placed on the inner side of the stud or wall. Such an arrangement is not as efficient as possible because heat can be conducted from wall surfaces directly to the frame elements, preventing the surrounding insulation. The provision of outer insulation, i.e. insulation placed on the outside of the stud frame can be helpful, but to date there has not been a reliable mean to apply said insulation. Further, insulation placed only externally will not provide sufficient heat and cold protection and therefore, spray or roll insulation will still have to be provided on the inner wall. Thus, the construction can be rendered expensive, cumbersome, and labor intensive.

In this regard, new forms of building construction have been disclosed. For example, U.S. Pat. No. 7,641,461 B2 discloses a robotic system for automated building construction such as offices and residential housing. Said system comprises a movable gantry robot including an overhead beam extending between, and supported by, at least two side members slidably assembled on a pair of rails; a nozzle assembly movably coupled to the overhead beam of the gantry robot and configured to extrude material through an outlet; and a position controller configured to control position and movement of the gantry robot and the nozzle assembly; wherein the robotic system is configured to rest on a surface and wherein the position controller comprises a position sensor configured to sense the position of the nozzle assembly with respect to multiple locations on the surface, and an actuator configured to controllably move the nozzle assembly to a desired position, in response to an output of the position sensor.

Moreover, U.S. Pat. No. 9,151,046 B1 discloses an automated building construction system. Said system comprises a base comprising an upper runner, a lower runner, said upper runner and said lower runner are supported and interconnected by one or more cross runners; a wall section comprising a frame, a wallboard, and a concrete layer wherein said wallboard is attached to an outer side of said frame, said wallboard providing exterior and interior insulation for said system, wherein said concrete layer is provided on said outer portion of said wallboard; wherein said base form is supported by a foundation footer; wherein said upper runner of said base form is configured to receive and support a lower outer frame member of said frame of said wall section; and wherein said base form comprises at least a portion of a support structure that supports said wall section.

However, there is a constant need for systems that do not involve too much construction equipment, and being cost-effective for construction companies. In this regard, the present invention provides an automated system for the construction and assembly of walls, ceilings, and stairs. Said system essentially comprises of at least one robotic arm and an automated bench upon which assembly and welding of floor, wall, ceiling, and stair type structures are carried out as well as their assembly to form a room type structure. As well as other elements and aspects that will be evident from the present description.

DETAILED DESCRIPTION

Figure 1:
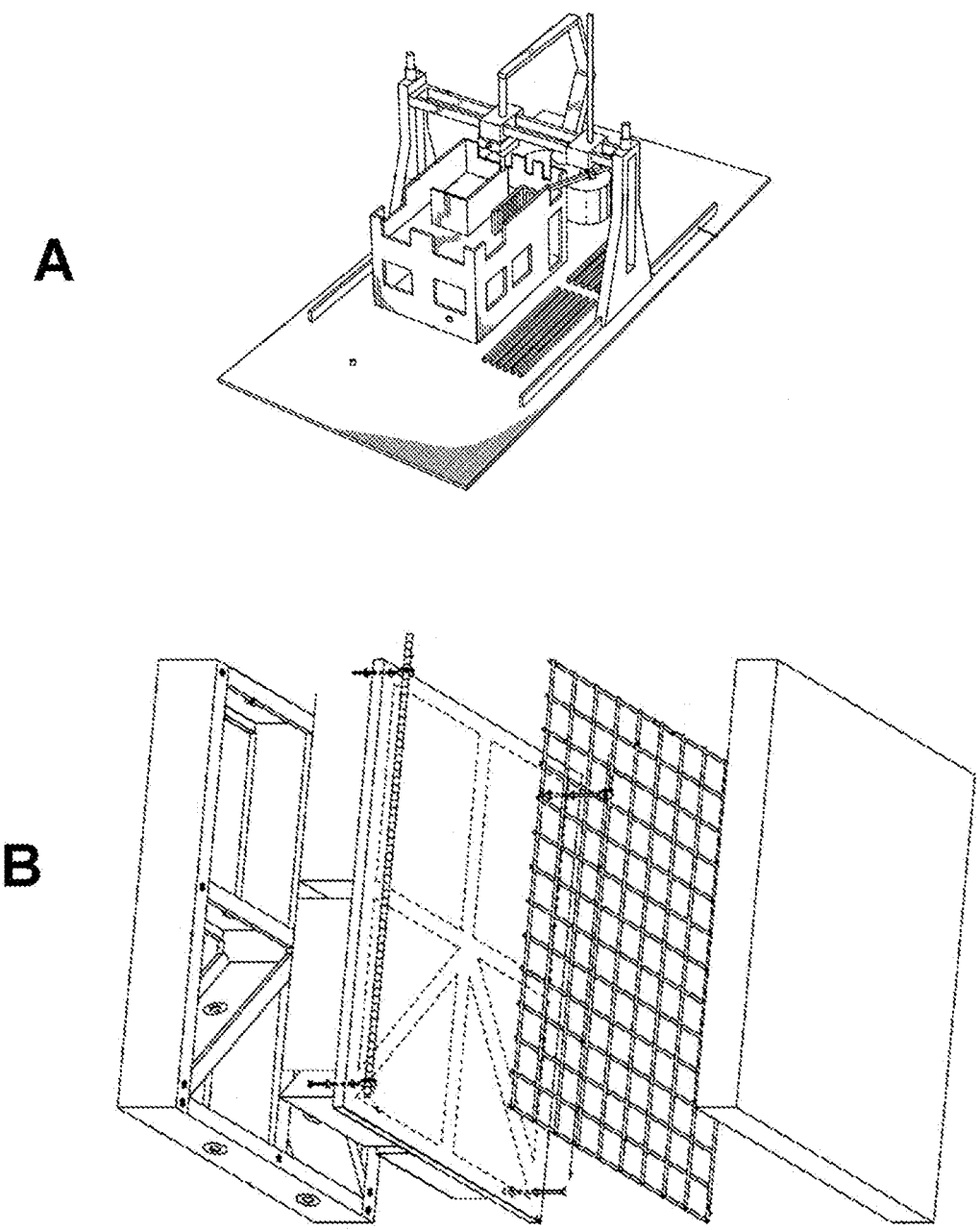
FIG. 1 is an isometric view of two construction systems disclosed in the prior art. In (A) the system disclosed in U.S. Pat. No. 7,641,461 B2 is shown, and (B) the system disclosed in U.S. Pat. No. 9,151,046 B1 is shown.
Figure 2:
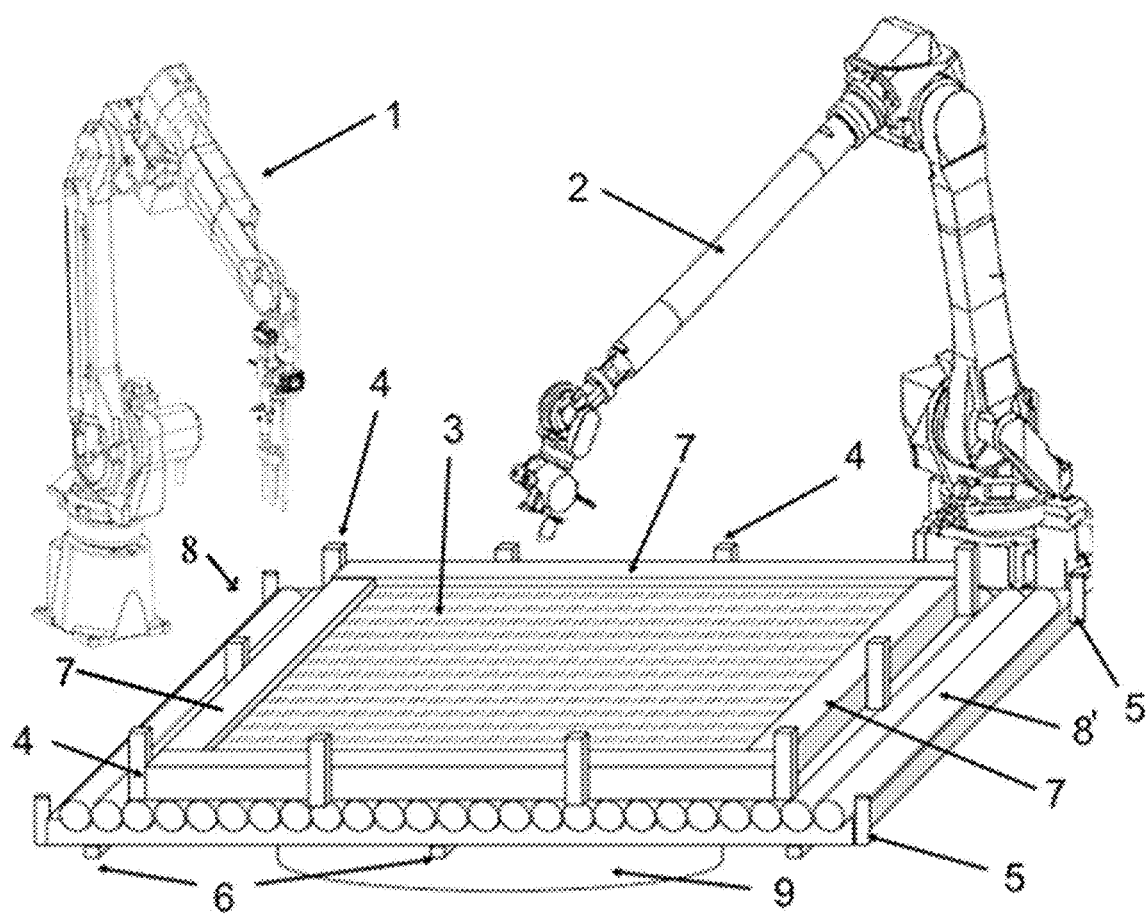
FIG. 2 is an isometric view of the automated and robotized construction system of the present invention.
Figure 3:
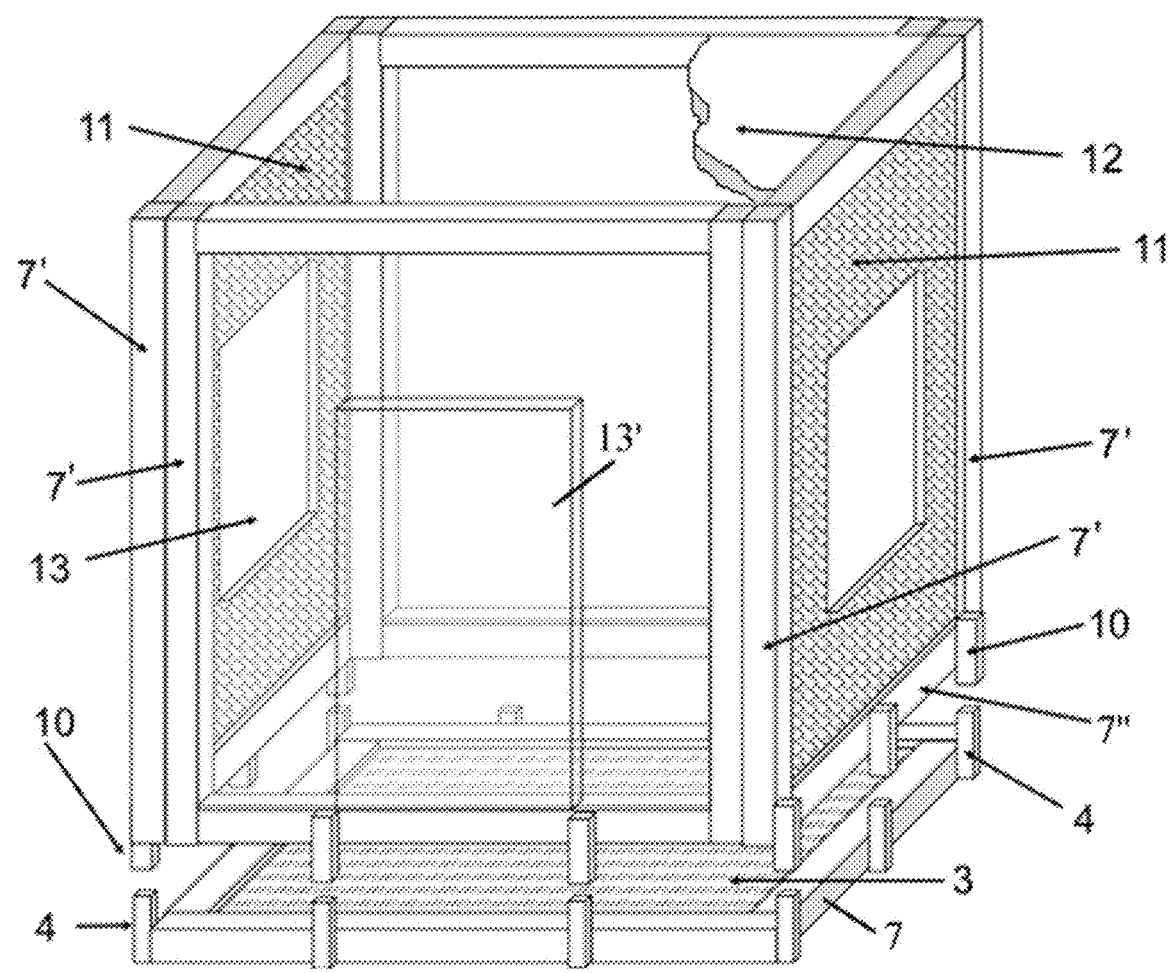
FIG. 3 is an isometric view of a room built with the system of the present invention.
Figure 4:
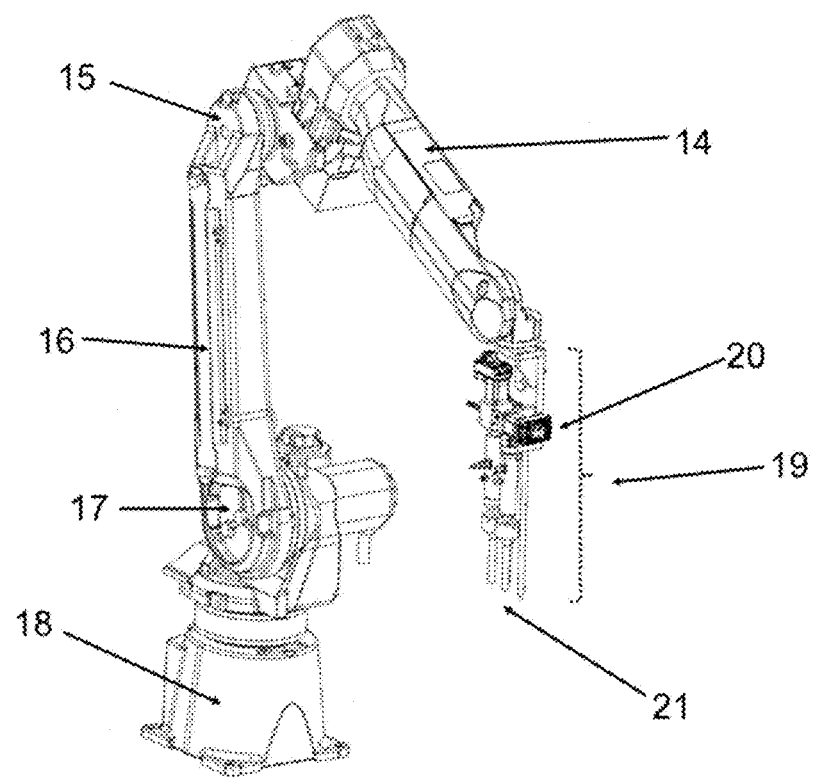
FIG. 4 is an isometric view of a robotic arm showing a type of tool.

The present invention relates to an automated and robotized construction system comprising: at least one programmable robotic arm (1, 2), with at least three degrees of freedom, preferably having six degrees of freedom; at least one interchangeable or non-interchangeable (fixed) tool (28), coupled to the programmable robotic arm, in such a way that the robotic arm is capable of interchanging or not interchanging the tool by itself according to its programming; a plurality of construction materials or elements arranged within reach of the robotic arm so that it can identify their position and pick them up; wherein said construction materials or elements are in a predetermined position and comprise: interconnecting crossbeams (7, 7', 7"), and/or precast floor panels (3), and/or precast ceiling panels (12), and/or precast wall panels (11), and/or doors, and/or windows, and/or wall panels with door or windows or combination thereof, and/or floor coverings, and/or bathroom furniture, and/or precast stairs, which can be gripped by at least one tool (28) and transported by the robotic arm; and wherein said at least one tool is selected from a welding device, a gripping and loading device, a sealing and/or gluing nozzle, and/or combinations thereof.

Figure 7:
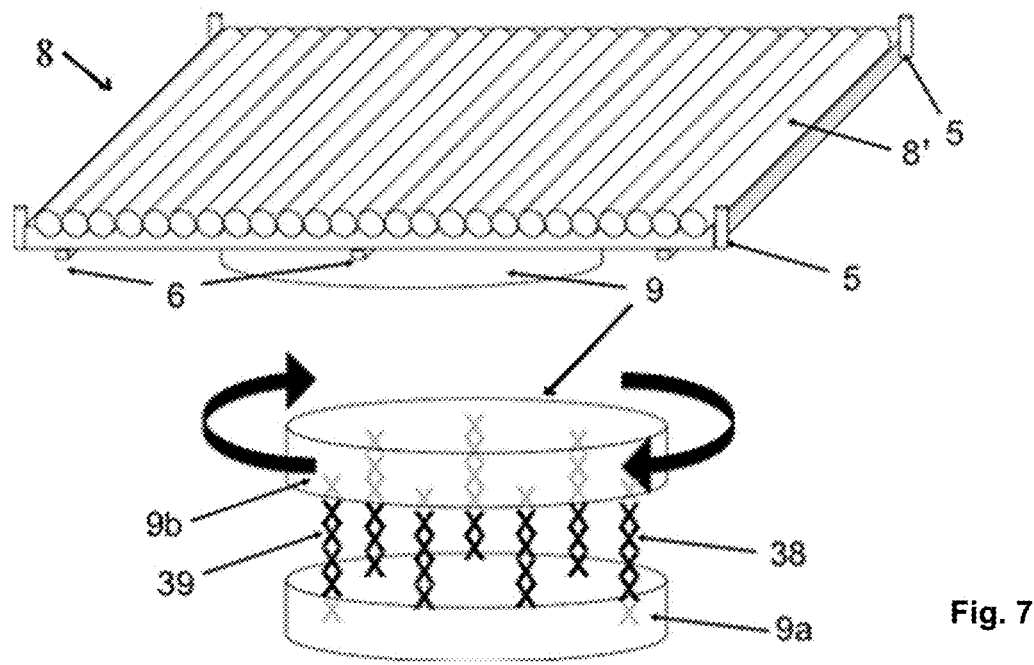
FIG. 7 is an isometric view of the sliding, rising and rotating system.

The automated and robotized construction system would include a sliding and/or rotating platform (8) upon which the construction will be carried out, a rotating and rising base (9) coupled to the lower center part of the platform (8), proximity sensors (5) preferably arranged at the corners of said sliding and/or rotating platform (8) and on the robotic arm, weight and/or position sensors (6) arranged on the lower part of said sliding and/or rotating platform (8), wherein said rotating and rising base (9), as can best be seen in FIG. 7, comprises a lower structure (9a) for resting on the ground, an upper structure (9b) coupled to said platform (8), and a rising system (38) preferably hydraulic or pneumatic, arranged between said lower structure (9a) and said upper structure (9b) for raising and/or lowering and/or leveling and/or rotating said platform (8). In this sense, the platform is adapted to vertically rise, by means of the base (9) that includes a movement system (38), and to horizontally rotate.

The system comprises reference or guide or alignment elements (not illustrated) arranged in the area where the building is desired, which allow the robotic arm to pick up the constructive elements from their predetermined position, align them and place said constructive elements in the correct position in the construction.

In one embodiment of the system, said platform (8) is configured to allow the constructive elements to be placed by said robotic arm (1, 2) in predetermined positions of the platform, thus allowing their suitable placement and assembly, thereby said platform (8) is further provided with reference, guide or alignment elements (not shown) to place the constructive elements thereon.

Additionally, said platform (8) allows the construction carried out directly on said platform (8) to be turned, slid or rotated by said platform (8) so that the construction can be carried out with desired width and length dimensions, and then placed in its final position, once finished, by mean of a crane.

The interchangeable tools used by the automated and robotized construction system can be a welding tool, a gripping and loading tool, and/or a sealant dispensing tool, or combinations thereof; the tool (28) can be: a gripping and loading tool, and in this case, be configured to grip structural profiles (hollow or solid, square, rectangular, polygonal or round tubes, crossbeams, "C" channels, "U" channels, "Z" channels, PTR, IPR, HSS profiles, made from metal, plastic, wood, carbon fiber, aluminum, etc.) and can grip one or several pieces at the same time and the tool (28) can be electronic, electrical, mechanical, hydraulic, pneumatic, vacuum, or a combination thereof, likewise said tool (28) can be manual, semi-automatic, or automatic, and can grip, either precast wall panels, sheetrock type panels, Durock® panels, panels W, laminated gypsum panels, EPS, lightweight concrete panels, sandwich panels, Alucobond® panels, composite aluminum panels, precast walls, access doors, windows, bars, toilets, lavatories, bathroom furniture, precast stairs, as well as floor covering pieces of the following types: tiles, ceramic floors, porcelain, talaveras, carpets, marble, vinyl, stone, wood, metal, concrete, glass, plastic, rubber, asphalt, cobblestone, adocreto, quarry, plastic resins, etc.; an adhesive and/or sealant dispensing tool to apply bonding agents such as chemical adhesives of epoxy, acrylate, methacrylate, urethane, polyurethane, acrylic, silane, polyamide, phenolic resin, cyanoacrylate, silicone, anaerobe, thermoplastic, elastomer, thermoset, rubber, polyester, hotmelt, plastisol, polyacrylate, cement, paste, tile adhesive types; a tool with welding device that can be of MIG, MIG-MAG, TIG, AC-TIG, MMA, MIG-MAG bi-pulse, FCAW, by gas, by arc, laser, friction, ultrasound, fusion weld, electrode, by resistance, dipped, flux-cored arc, stud-welding, spot, of bolts, by hydrogen, by coal, by plasma types, or any other type.

The gripping and loading tool would comprises means that cooperate with means arranged in the constructive elements, to achieve a suitable gripping, said means in the constructive elements can be selected or adapted depending on the type of constructive element, in one embodiment, magnetic or electromagnetic means or suction cups may be used.

Likewise, in another embodiment, the construction system can include a linear track or linear axis, not illustrated, upon which said at least one robotic arm (1, 2) is slidably assembled, so that it works as an additional displacement axis of the robotic arms, giving an additional degree of freedom to the robotic arms that are installed thereon.

The plurality of construction materials comprises interconnecting crossbeams (7) with female connectors (4), floor or wall interconnecting crossbeams (7', 7") with male connectors (10) to be assembled with said interconnecting crossbeams with female connectors (4), precast floors (3), precast ceilings (12), precast walls with window (13), precast walls without window or door (11) and/or precast walls with door (13').

Each constructive element has complementary reference, guide or alignment elements (not illustrated) so that the correct installation can be performed with said reference, guide or alignment elements that are on the work surface or on the platform (8) and which are used by the robotic arm for a correct installation.

Figure 6:
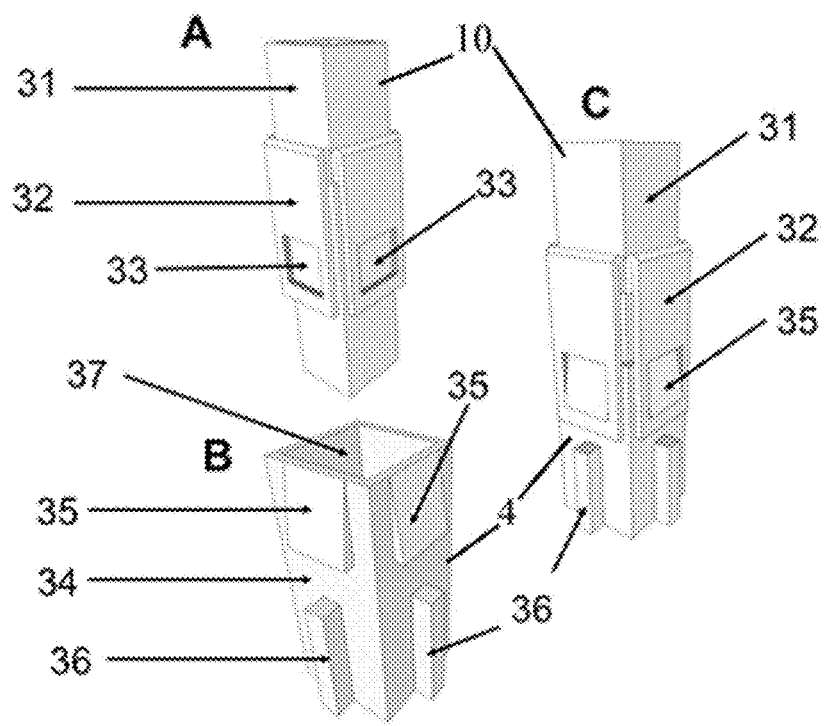
FIG. 6 is an isometric view of the assembly system between walls and floor, showing its parts and how they are assembled in detail.

As can better be seen in FIG. 6, said female connectors (4) of said interconnecting crossbeams (7), shown in B, comprises an elongated body (34), a gap (37) or socket, preferably conical, with outer assembly protrusions (35), preferably in the shape of wedge and stop elongations or outer protrusions (36), arranged below and away from said assembly protrusions (35). The male connectors (10) of said floor or wall interconnecting crossbeams (7, 7'), shown in A, comprises an elongated body (31) to fit in the female body and an assembly structure (32) with assembly holes (33) to receive and trap said assembly protrusions (35) of the female connector, so that said male connector (10) engages said female connector (4), obtaining interconnection and fixture between male and female. As can better be seen in C, said assembly structure (32) comprises tongues or fins or claws, which can be resilient or semi-rigid, that grip and hold the body (34) of the female connector (4) allowing said assembly protrusions (35) to be trapped by said assembly holes (33) of said male connector (10), when tongue-and-groove (dovetailing) is made, the stop elongations (36) allowing the crossbeam settlement, thus preventing undesired displacement.

Said at least one robotic arm includes an upper joint (15, 23) that articulately engages an upper robotic end (14, 22) with a lower robotic end (16, 24), a lower joint (17, 25) that articulately engages a base (18, 26) with said lower robotic end (16, 24), wherein said at least one tool (19, 28) is detachably arranged at one end of a joint of the upper end or wrist of the arm. A proximity sensor system (20), arranged in said at least one robotic arm, allows the robotic arm (1, 2) to determine the position of the constructive elements and approach the predetermined position thereof to pick them up and bring them to the construction place while placing in the desired construction position.

When said robotic arm picks up a constructive element it will perform a check or alignment operation so that the constructive element can be placed in the desired and correct construction position. In one embodiment, an aligner can be used wherein said robotic arm will bring the constructive element to place it in a preset position for subsequent transfer and placement in the building.

Alternatively, the automated and robotized construction system of the present invention preferably uses two robotic arms (1, 2) working in coordination by means of programming.

Best Method of Carrying Out the Invention

An automated and robotized construction method, which uses the construction system of the present invention comprises the following steps:

a.—Said at least one programmable robotic arm (1, 2) identifies said at least one tool (28) to be needed according to its programming, automatically places said tool thereon by taking it from a predetermined position, picks up a floor interconnecting crossbeam (7) with female connectors (4) and places it on the construction surface or on the sliding and/or rotating platform (8).

b.—Said at least one robotic arm (1, 2) proceeds to pick up and transfer the necessary floor interconnecting beams with female connectors (4) to the construction surface or platform to form a lower frame.

c.—Said robotic arm (1, 2) proceeds to load, transfer and place a precast floor panel (3) onto the frame, if this operation requires a tool change, it is automatically performed beforehand.

d.—Once the floor frame and the floor have been placed, said robotic arm changes said tool (28) to a fixing tool, for example, a welding tool (19) and proceeds to weld the joints between the crossbeams, coupling or joining the lower or floor frame.

e.—Said at least one robotic arm changes its tool to a gripper tool, if is needed, loads and transfers wall interconnecting beams (7', 7") with male connectors (10) to form the walls, engaging said male connectors (10) with said female connectors (4) of the lower or floor frame.

f.—Said at least one loading robotic arm transfers precast wall panels (11), either with window (13), with door (13'), or without them, arranging them between said interconnecting crossbeams (7) with male connectors (10), if this operation requires a tool change, it is automatically performed beforehand.

g.—Said at least one robotic arm changes and places the predetermined tool thereon and will begin to fix, couple or join said interconnecting crossbeams to male connectors in accordance with programming established by proximity and location sensors, preferably this coupling is done by welding, but can be done by adhesives and/or screws and/or rivets and/or nails and/or stapling and/or binding, according to the constructive element or building design.

h.—This action will continue until a room or space with floors and walls or a section thereof is formed.

i.—Said at least one robotic arm transfers floor covering pieces, either one at a time, or several at the same time, applies an adhesive agent onto said pieces by the dispensing tool, and places said pieces on the precast floor panels.

j.—Said at least one robotic arm transfers ceiling interconnection crossbeams with female connectors (4) coupling them to the upper end of the interconnection wall crossbeams with male connectors (10) forming a top or ceiling frame, if this operation requires a tool change, it is automatically performed beforehand.

k.—Said at least one robotic arm grips and transfers precast ceiling panels (12) and places them on the upper or ceiling frame, if this operation requires a tool change, it is automatically performed beforehand.

l.—Once the upper frame and the ceiling have been placed, said robotic arm proceeds to couple or join or fix the interconnection crossbeams; preferably this coupling is done by any kind of welding, but can be done by using adhesives, screws, rivets, nails, staples, binding, or a combination thereof.

m.—Said at least one robotic arm grips precast stair sections and places them on the structure that is being built, in preset positions, and by means of guide elements, until a complete stair block is formed, joined to the frame previously made with the crossbeams, if this operation requires a tool change, it is automatically performed beforehand.

If necessary, the bathroom furniture is placed or the furniture necessary according to the project, using the robotic arm.

n.—Once the floors, walls and ceilings have been assembled, said at least one robotic arm proceeds to seal the joints between these elements by using the sealant dispensing tool, if this operation requires a tool change, it is automatically performed beforehand.

o.—When the building is assembled, at least one crane or forklift is used, to put the constructed building in its final location.

p.—The above assembly sequences can be carried out preferably with at least one robotic arm, but they can also be carried out with two or more robotic arms.

Each time said robotic arm (1, 2) picks up a constructive element from its predetermined position, it checks alignment or performs an alignment action of the constructive element, to then bring said constructive element to its installation position.

The platform (8) allows the robotic arm(s) to construct room sections, by allowing the previously built part to be moved or rotated so as to assemble more constructive elements until achieving the final construction.

Since the constructive elements are arranged in a preset position, it is not necessary to have very complex identification elements for the constructive elements, however, in addition to the proximity sensors, a graphic recognition program or other identification elements could be used.

As can be seen, the present invention provides a construction and assembly system of buildings with floors, walls, and ceilings, which, in turn, allows different elements such as bathroom furniture and stairs as well as floor coverings to be placed.

It is necessary to highlight that said system is designed to build and assemble floors, walls, ceilings, and stairs of any size. It should be understood that the materials and sizes of the different components should not be limiting of the invention; that is, the size of both the robotic arms and the platform will not be limiting of the invention. Likewise, proximity, location and weight sensors can be of any type of brand and design, as long as they satisfy the minimum system functions. Similarly, the welding, screwing, stapling, binding, nailing, or riveting system of the robotic arm may vary in type and material, according to user requirements; therefore, each robotic arm may vary based on the needs thereof.

Said system carries out the construction and assembly, either of floors, walls or ceilings, as needed. The robotic loading and assembly arm (2) picks up an interconnecting crossbeam (7) and places it onto the sliding and rotating platform. Once in place, it proceeds to transfer the next floor interconnecting crossbeams (7) to the platform (8) or to the construction area to form a lower floor frame by using the proximity sensors (5) located in both the construction area or, if appropriate, the platform (8), and the robotic loading and assambly arm (2). Subsequently, the same robotic arm proceeds to load, transfer and place at least a precast floor panel (3) onto the frame.

Once the lower frame and the floor have been placed, for example, a robotic welding arm (1) proceeds to weld the joints between the interconnection crossbeams or fix them by another suitable means. In the same way as the robotic loading and assembly arm (2), said robotic welding arm carries out its function due to the fact that it is programmed for the recognition of interconnection crossbeams by means of proximity sensors. It should be noted that the floor interconnecting crossbeams (7) carry a series of female connectors (4) located in various parts thereof.

Once the floor assembly has been carried out, the system is programmed so that the robotic loading arm (2) again transfers the wall interconnecting crossbeams (7' or 7") to now place them as wall crossbeams, forming a wall frame. In this sense, the platform (8) is adapted to vertically rise by means of a base (9) including a series of pneumatic scissors (38), and to horizontally rotate (as illustrated by the arrows in FIG. 7). Thus, the robotic loading and assembly arm (2) will proceed to place the interconnection crossbeams (7' or 7"). Once each wall frame has been assembled with its respective precast wall, either with window (13), with door (13"), or without them (11), the robotic welding arm (1) will begin to weld the interconnection crossbeams in accordance with programming established by the proximity and weight sensors (5), (6). It should be noted that the lower wall interconnection crossbeam (7") comprises a series of male connectors (10) located in various parts thereof. These connectors are inserted into their counterparts (female connectors (4)) located in the floor interconnecting crossbeams (7). Once the construction and assembly of the first wall has been finished, the robotic arm proceeds to assemble the second wall, and the robotic arm carries out the join, fixing or clamping thereof, for example by welding. This action will continue until a room or room with ceiling has been formed. By means of the platform (8), the construction can be made thereon by rotating or sliding said construction, so that the built parts or already built floor, wall and ceiling sections can be rotated and/or slid so that the construction continues next to these sections by using the same procedure.

It should be noted that the wall, floor and ceiling length can vary according to the user needs. Likewise, the coupling between the different walls can be carried out manually or automatically, by using welding, adhesives, screws, or rivets. Thus, the coupling is not limited to a particular form. In the same way as the coupling between walls and floors, the coupling between walls and ceilings is carried out by means of interconnection between a male connector (10) and a female connector (4).

The robotic arms that make up the system of the present invention have basic features. For example, a robotic arm has six degrees of freedom, but can have an additional degree of freedom, i.e. seven, due to being placed on a rail, this means that has the ability to move forward/backward, up/down, left/right (translation in three perpendicular axes), combined with the rotation on three perpendicular axes (yaw, pitch, roll), and translation. In one embodiment, the arm has an upper robotic end (14), which is connected to a lower end (16) by means of a joint (15); by its part opposite to the coupling to said joint the upper end is coupled to a welding device (19), which has the function of welding the ends of the interconnecting crossbeams (7, 7', 7"). Whereas the lower end of the robotic arm is coupled to a base (18) by a lower joint (17). It is vitally important that said robotic arm comprises a proximity sensor system (20) which is complementary to the proximity sensor system (5) present on the sliding and rotating platform. Said welding device has the common devices for welding, among them are the welding tips (21).

Figure 5:
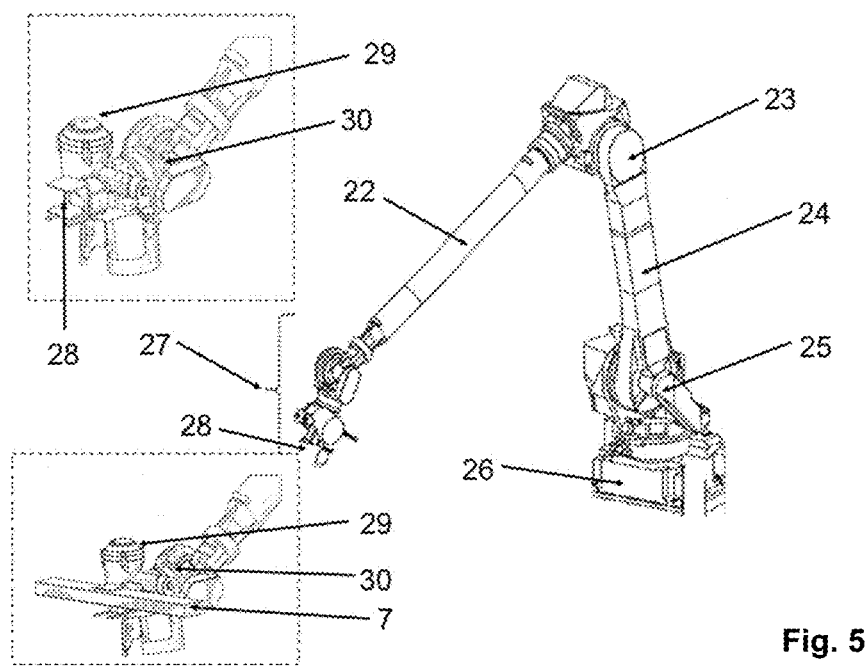
FIG. 5 is an isometric view of a robotic arm depicting another type tool, a gripper one, showing its ready position and a gripping position of a constructive element in detail.

In the same way, in a preferred embodiment, the robotic loading and assembly arm has six degrees of freedom, i.e. it has the ability to move forward/backward, up/down, left/right (translation in three perpendicular axes), combined with the rotation on three perpendicular axes (yaw, pitch, roll). As can be seen in FIG. 5, it has an upper robotic end (22), which is connected to a lower end (24) by a joint (23); by its part opposite to the coupling to said joint the upper end is coupled to a loading and assembly device (27) which has the function of transferring and assembling the ends of said interconnecting crossbeams (7). Whereas the lower end of the robotic arm is coupled to a base (26) by a lower joint (25). It is vitally important that said robotic arm comprises a proximity sensor system which is complementary to the proximity sensor system (5) present in the sliding and rotating platform (8). The loading and assembly device has a loading and assembly gripper (28) which operates by a motor (29) and a gripping joint (30) that allows total movement control.

On the other hand, the system that allows the assembly between walls and floors, and walls and ceilings, is based on a tongue-and-groove (dovetailed) connection system. The components of said system are said female connectors (4)

and said male connectors (10). In FIG. 6, each of said connectors is shown. In A, the male connector (10) is shown, in B, the female connector (4) is shown, and in C, their assembly is shown. The male connector comprises of a hollow square-based prism-shaped body (31) which has, on at least two of its adjacent faces, respective assembly structures (32) in the form of rectangular fins, tongues or claws that have a hole (33) at their lower ends. Whereas the female connector (4) also comprises of a square-based prism-shaped body (34) which has, on at least two of its adjacent faces, respective assembly structures (35) which will be housed within the holes (33) to strengthen the assembly. Below each assembly structure (35) there are two square-based prism-shaped elongations or abutments (36) which have the function of serving as an abutment of the crossbeams and the fins, tongues or claws once formed in the tongue-and-groove assembly.

Finally, the sliding and/or rotating platform (8) of the system consists of a platform of a rectangular or square shape, depending on the user needs, which has the function of rotating, sliding or rising as needed. The platform can consist of a mechanical band, or any other device that allows the sliding. By way of example, the platform can consist of a system of rollers (8') which can rotate around themselves according to a preset programming by a system of motors interconnected to said rollers. Said rollers may be on a second platform. The platform has two series of sensors, the proximity sensors (5) and the weight sensors (6). Said sensors are arranged in such a way as to allow automated control of the proximity with the robotic arms.

As mentioned, the platform (8) allows the construction to be moved, once a section thereof has been finished, the platform needs to be rotated to continue building the remaining parts. The rotation system is carried out by a base consisting of two self-assembled structures placed on top of each other. By way of example, FIG. 7 shows that said structure (9) consists of two cylindrical structures placed on top of each other (9a and 9b) that by means of a motor allow the circular movement of the upper structure. Since said base is interconnected to the platform, the rotation will result in the circular movement of the platform as a whole. In order to carry out the action of raising the platform, the base contains a series of pneumatic scissors that due to the programming thereof can carry out its action at any raising angle. Each scissor is arranged on the inside of the base in a programmed way.

The automated and robotized construction system can be installed on a movable platform that allows it to be moved anywhere. Similarly, the construction materials are arranged on a platform wherein they are available to be taken from their predetermined position.

The invention claimed is:

1. An automated and robotized construction system comprising:
   at least one programmable robotic arm;
   at least one tool attachable to the programmable robotic arm;
   a plurality of construction materials arranged in a predetermined position so that the programmable robotic arm identifies their arrangement and can pick them up;
   a sliding, rising and/or rotating platform, wherein the construction and/or assembly is carried out on the sliding, rising and/or rotating platform, wherein the sliding, rising and/or rotating platform comprises proximity sensors;
   wherein said construction materials are selected from at least interconnecting crossbeams for floor, wall or ceiling, elements for floor, ceiling, or wall, which can be gripped by said at least one tool and transported and installed by the robotic arm; and
   said at least one tool is selected from a welding tool or device, a gripping and loading tool or device, a sealing and/or gluing tool or system, and/or combinations thereof.

2. The automated and robotized construction system according to claim 1, wherein said sliding, rising and/or rotating platform further comprises position sensors.

3. The automated and robotized construction system according to claim 2, wherein said sliding, rising or rotating platform comprises a rotating and rising base comprising a lower structure, an upper structure coupled to the platform, and a rising system.

4. The automated and robotized construction system according to claim 1, wherein said at least one tool is interchangeable by the robotic arm itself according to the programming thereof, so that the programmable robotic arm is able to interchange and select the tool by itself according to the needs of a constructive design.

5. The automated and robotized construction system according to claim 1, wherein said at least one tool is fixed to said robotic arm.

6. The automated and robotized construction system according to claim 1, wherein said at least one robotic arm includes an upper joint that articulately engages an upper robotic end with a lower robotic end, a lower joint that articulately engages a base with said lower robotic end, wherein said at least one tool is detachably arranged at the end of the upper joint, and a proximity sensor system arranged in said at least one robotic arm.

7. The automated and robotized construction system according to claim 1, preferably comprising two robotic arms each having six degrees of freedom.

8. The automated and robotized construction system according to claim 1, wherein said system is installed on a movable platform that allows it to be moved anywhere.

9. The automated and robotized construction system according to claim 1, wherein said sliding, rising and/or rotating platform comprises a system of rollers which can be rotated by a system of motors interconnected to said system of rollers.

10. An automated and robotized construction system comprising:
    at least one programmable robotic arm;
    at least one tool attachable to the programmable robotic arm; and
    a plurality of construction materials arranged in a predetermined position so that the programmable robotic arm identifies their arrangement and can pick them up;
    wherein said at least one tool is selected from a welding tool or device, a gripping and loading tool or device, a sealing and/or gluing tool or system, and/or combinations thereof,
    wherein the gripping and loading tool comprises
    means that cooperate with said gripping and loading tool or device to be able to grip construction materials, such that the gripping and loading tool or device is able to grip structural profiles and can grip one or several construction materials at the same time, wherein said cooperating means can be electronic, electrical, mechanical, hydraulic, pneumatic, vacuum, or a combination thereof,
    wherein said gripping and loading tool or device can be manual, semi-automatic, or automatic, and can grip construction materials, wherein said construction materials are selected from a group consisting of interconnecting crossbeams for floor, wall or ceiling, elements for floor, ceiling, wall, floor or ceiling panels, sheetrock type panels, laminated gypsum panels, lightweight concrete panels, sandwich panels, aerated concrete panels, concrete panels, bricks, concrete blocks, sandwich panels, composite aluminum panels, precast walls, access doors, windows, bars, toilets, lavatories, bathroom furniture, precast stairs, and floor covering pieces.

11. An automated and robotized construction system comprising:
at least one programmable robotic arm;
at least one tool attachable to the programmable robotic arm;
a plurality of construction materials arranged in a predetermined position so that the programmable robotic arm identifies their arrangement and can pick them up;
wherein said construction materials are selected from at least interconnecting crossbeams for floor, wall or ceiling, elements for floor, ceiling, or wall, which can be gripped by said at least one tool and transported and installed by the robotic arm; and
said at least one tool is selected from a welding tool or device, a gripping and loading tool or device, a sealing and/or gluing tool or system, and/or combinations thereof,
wherein the sealing and/or gluing tool or system is able to apply bonding agents are selected from a group comprising chemical adhesives of epoxy, acrylate, methacrylate, urethane, polyurethane, acrylic, silane, polyamide, phenolic resin, cyanoacrylate, silicone, anaerobe, thermoplastic, elastomer, thermoset, rubber, polyester, hotmelt, plastisol, polyacrylate, cement, paste, and tile adhesive types.

12. An automated and robotized construction system comprising:
at least one programmable robotic arm;
at least one tool attachable to the programmable robotic arm;
a plurality of construction materials arranged in a predetermined position so that the programmable robotic arm identifies their arrangement and can pick them up;
wherein said construction materials are selected from at least interconnecting crossbeams for floor, wall or ceiling, elements for floor, ceiling, or wall, which can be gripped by said at least one tool and transported and installed by the robotic arm; and
said at least one tool is selected from a welding tool or device, a gripping and loading tool or device, a sealing and/or gluing tool or system, and/or combinations thereof,
wherein with the welding tool or device welds by MIG, MIG-MAG, TIG, AC-TIG, MMA, MIG-MAG bi-pulse, FCAW, gas, arc, laser, friction, ultrasound, fusion weld, electrode, by resistance, dipped, flux-cored arc, stud-welding, or spot welding.

13. An automated and robotized construction system comprising:
at least one programmable robotic arm;
at least one tool attachable to the programmable robotic arm;
a plurality of construction materials arranged in a predetermined position so that the programmable robotic arm identifies their arrangement and can pick them up;
wherein said construction materials are selected from at least interconnecting crossbeams for floor, wall or ceiling, elements for floor, ceiling, or wall, which can be gripped by said at least one tool and transported and installed by the robotic arm; and
said at least one tool is selected from a welding tool or device, a gripping and loading tool or device, a sealing and/or gluing tool or system, and/or combinations thereof,
wherein the plurality of construction materials comprises cooperating means that cooperate with the at least one tool and
interconnecting crossbeams with female connectors,
interconnecting crossbeams with male connectors to be assembled with said interconnecting crossbeams with female connectors; or
precast floor, wall or ceiling panels, precast stairs, precast wall panels with window, precast wall panels with or without at least one window or door.

14. The automated and robotized construction system according to claim 13, wherein said female connectors of the interconnecting crossbeams comprises an elongated hollow body, a gap, with outer assembly protrusions, and stop or abutment elongations or outer protrusions arranged below said assembly protrusions.

15. The automated and robotized construction system according to claim 13, and wherein said male connectors from the floor or wall interconnecting crossbeams comprises an elongated body and an assembly structure with assembly holes to receive and trap said assembly protrusions of the female connector.

16. An automated and robotized construction system comprising:
at least one programmable robotic arm;
at least one tool attachable to the programmable robotic arm;
a plurality of construction materials arranged in a predetermined position so that the programmable robotic arm identifies their arrangement and can pick them up;
wherein said construction materials are selected from at least interconnecting crossbeams for floor, wall or ceiling, elements for floor, ceiling, or wall, which can be gripped by said at least one tool and transported and installed by the robotic arm; and
said at least one tool is selected from a welding tool or device, a gripping and loading tool or device, a sealing and/or gluing tool or system, and/or combinations thereof,
wherein two robotic arms are used, and wherein the automated and robotized construction system further comprises a sliding platform.

17. An automated and robotized construction method, which uses the construction system of claim 1, and which comprises the following steps:
forming at least one floor frame section using interconnecting crossbeams with the help of said at least one robotic arm;
placing at least one floor element on said at least one floor frame section by said robotic arm.

18. The automated and robotized construction method according to claim 17, that further comprising
forming at least one wall frame section with said at least one robotic arm using interconnecting crossbeams; and
placing at least one wall element in said at least one wall frame section with said at least one robotic arm.

19. The automated and robotized construction method according to claim 18, wherein it further comprises:
forming at least one ceiling frame section with said at least one robotic arm and;

placing at least one ceiling element in said at least one ceiling frame section with said at least one robotic arm.

\* \* \* \* \*